T. E. MURRAY.
VALVE.
APPLICATION FILED JAN. 24, 1917.

1,235,150.

Patented July 31, 1917.

INVENTOR
Thomas E. Murray
BY
his ATTORNEY

UNITED STATES PATENT OFFICE.

THOMAS E. MURRAY, OF NEW YORK, N. Y.

VALVE.

1,235,150.  Specification of Letters Patent.  Patented July 31, 1917.

Application filed January 24, 1917. Serial No. 144,133.

*To all whom it may concern:*

Be it known that I, THOMAS E. MURRAY, a citizen of the United States, residing at New York, in the county of New York and State of New York, have invented a certain new and useful Improvement in Valves, of which the following is a specification.

The invention is a valve, and consists in the construction more particularly hereinafter claimed, whereby the manufacture is cheapened and simplified.

In the accompanying drawings—

Figure 1:
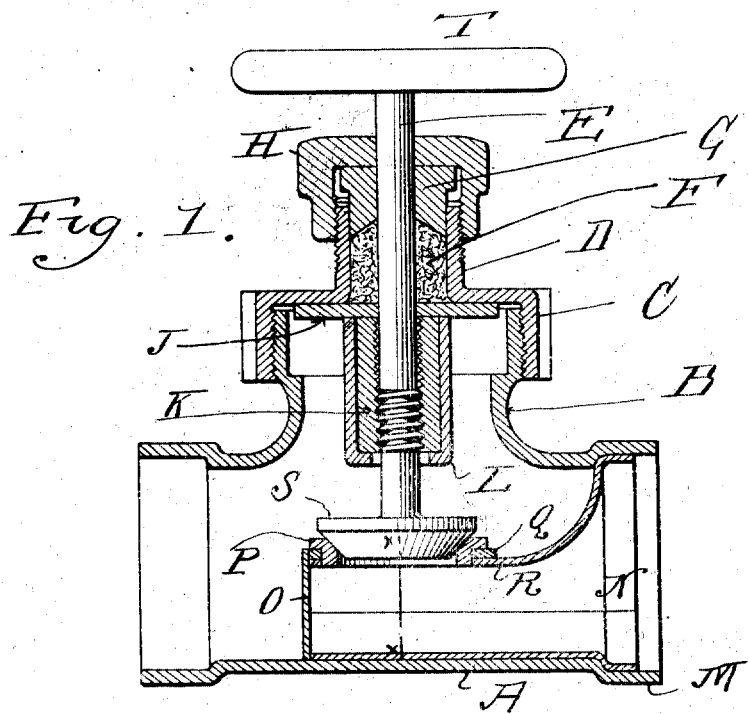
Figure 2:
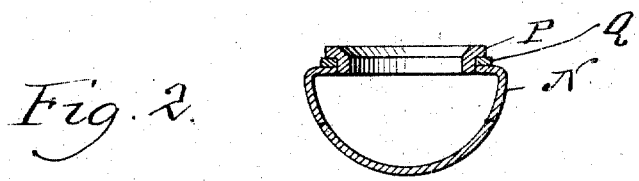

Figure 1 is a vertical section of my valve. Fig. 2 is a transverse section of the valve seat on the line $x, x$ of Fig. 1.

Similar letters of reference indicate like parts.

A is the valve casing, preferably made in two longitudinally divided parts electrically welded at their meeting edges. The laterally projecting tubular portion B of said casing is exteriorly threaded to receive the cap C, which has a tubular portion D forming the stuffing-box for the valve stem E, and receiving the usual packing F, gland G and threaded cover H. To the inner side of cap C is electrically welded a plate J, which retains the packing in the box D. The valve stem E is threaded to engage in a nut K. Said nut is received in and is held in place by a steel cup L, welded at its circumferential edge to plate J, and having in its bottom an opening for the valve stem.

At one end of the casing A is a shouldered circular enlargement M which receives the enlarged end of the inserted tube N which is closed at its inner end by a wall O. Said tube is made of struck up, stamped or pressed sheet metal in two longitudinally divided sections united at their meeting edges by electric welding. One wall R is flat, as shown in Fig. 2, and has an opening which receives the internally beveled flanged ring P. A ring washer Q is inserted between wall R and the flange of ring P. The valve S is seated in the ring P and secured on the end of stem E. The stem carries the usual hand wheel T, by turning which said stem may be rotated to open or close the valve.

I claim:

1. A tubular casing having end openings and a lateral tubular projection, a cap on said projection, a valve stem passing through said cap, a nut within said casing receiving a threaded portion of said valve stem, a metal cup having its edges carried by said cap, inclosing said nut and having an opening in its bottom for the passage of said stem, a valve on said stem, and a partition in said casing having a valve seat opening receiving said valve.

2. A tubular casing having end openings and a lateral tubular projection, a cap on said projection, a tubular stuffing-box in said cap, a plate on the under side of said cap closing said box, a valve stem passing through said stuffing-box and plate, a nut within said casing receiving a threaded portion of said stem, a metal cup having its edges secured to said plate, inclosing said nut and having an opening in its bottom for the passage of said stem, a valve on said stem, and a partition in said casing having a valve seat opening receiving said valve.

3. A casing having end openings, a tube entering said casing closed at its inner end and at its outer end fitting in one of said end openings, the said tube being formed in two sections longitudinally divided on a plane eccentric to the secured outer end of said tube, one of said sections having a valve seat in its wall, the said sections being stamped, pressed or struck up from sheet metal and electrically welded at their registering edges, a valve in said seat, and means for opening and closing said valve.

In testimony whereof I have affixed my signature in presence of two witnesses.

THOMAS E. MURRAY.

Witnesses:
GERTRUDE T. PORTER,
MAY T. McGARRY.